(12) United States Patent
Kurose et al.

(10) Patent No.: US 8,494,523 B2
(45) Date of Patent: Jul. 23, 2013

(54) MOBILE COMMUNICATIONS SYSTEM AND MOBILE RADIO TERMINAL

(75) Inventors: Kengo Kurose, Hamura (JP); Yutaka Asanuma, Tokyo (JP); Shigeo Terabe, Hachioji (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 1174 days.

(21) Appl. No.: 11/998,954

(22) Filed: Dec. 3, 2007

(65) Prior Publication Data

US 2009/0011764 A1    Jan. 8, 2009

(30) Foreign Application Priority Data

Jul. 4, 2007  (JP) ................. 2007-176569

(51) Int. Cl.
*H04W 36/00* (2009.01)
*H04W 4/00* (2009.01)

(52) U.S. Cl.
USPC ..................................... 455/436; 455/435.2

(58) Field of Classification Search
USPC .................. 455/436, 435.1–435.2, 438, 439; 370/331–333
See application file for complete search history.

(56) References Cited

U.S. PATENT DOCUMENTS

| | | | |
|---|---|---|---|
| 6,473,411 B1 * | 10/2002 | Kumaki et al. | 370/331 |
| 6,516,193 B1 * | 2/2003 | Salmela et al. | 455/432.3 |
| 6,549,775 B2 * | 4/2003 | Ushiki et al. | 455/432.1 |
| 7,701,872 B2 | 4/2010 | Islam et al. | |
| 7,848,755 B2 * | 12/2010 | Cha et al. | 455/436 |
| 2007/0004408 A1 * | 1/2007 | Buckley et al. | 455/435.2 |
| 2007/0037577 A1 * | 2/2007 | Dalsgaard et al. | 455/436 |
| 2010/0211993 A1 | 8/2010 | Islam et al. | |
| 2011/0003594 A1 * | 1/2011 | Cooper | 455/436 |

FOREIGN PATENT DOCUMENTS

| | | |
|---|---|---|
| JP | 2006-505201 A | 2/2006 |
| WO | 2007-020515 A1 | 2/2007 |

OTHER PUBLICATIONS

Japanese Office Action dated Sep. 6, 2011 as received in related application No. 2007-176569.
3GPP TR 25.814 Physical Layer Aspects for Evolved Universal Terrestrial Radio Access (UTRA) (Release 7) Technical Report; pp. 2-132.

* cited by examiner

*Primary Examiner* — Charles Appiah
*Assistant Examiner* — Emem Stephen
(74) *Attorney, Agent, or Firm* — Maschoff Brennan

(57) ABSTRACT

Mobile station notifies base station of identification information of base stations searched by searching as a search list, and the base station notifies the mobile station of base stations which are not regarded as prestored neighbor base stations and base stations which are in an unusable base station list, of the base stations in the notified search list, as an NG list. If necessity of handover is increased, the mobile station receiving the notification executes handover to base stations (for example, base station) in the search list other than the base stations included in the NG list.

10 Claims, 3 Drawing Sheets

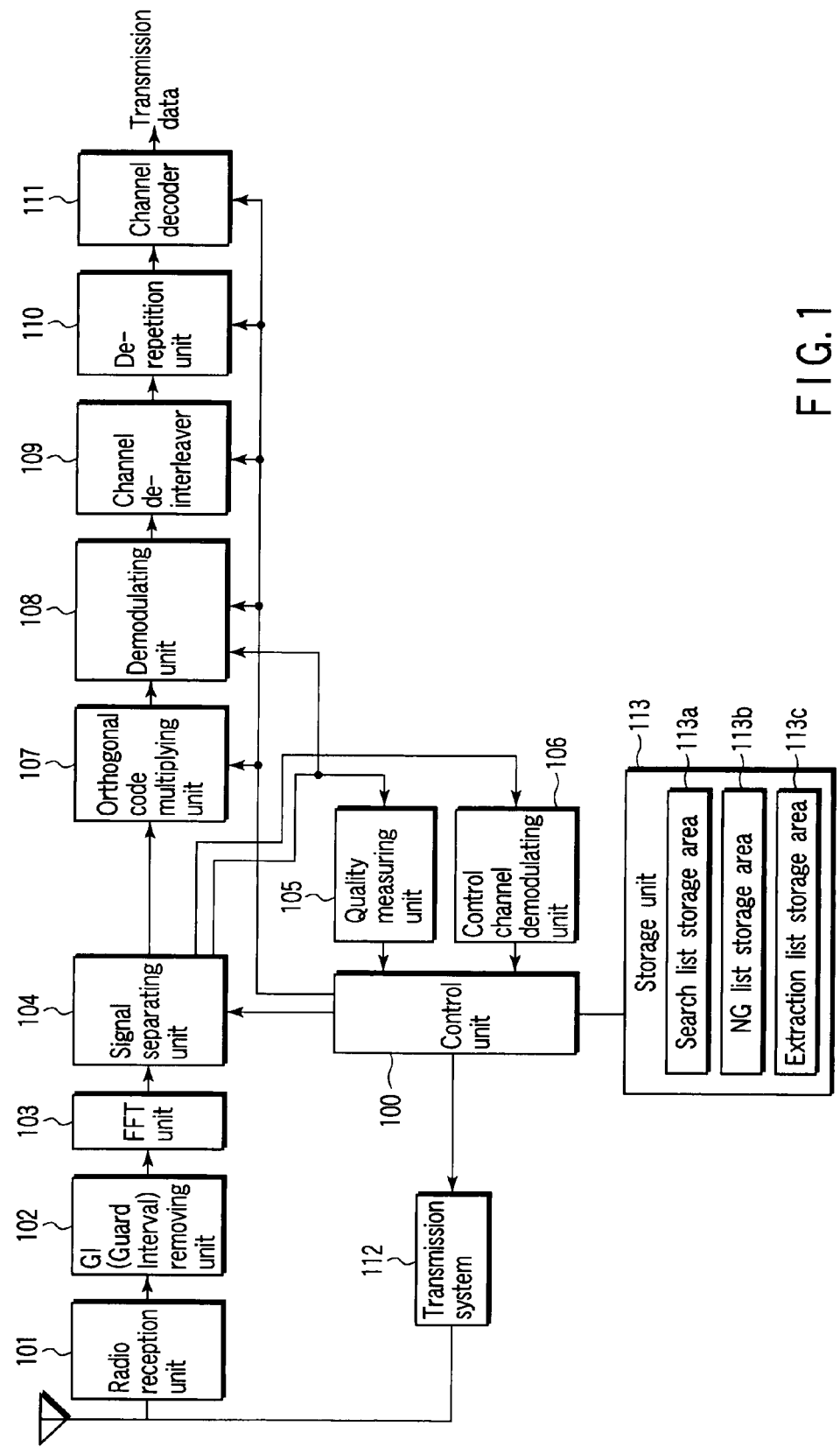
F I G. 1

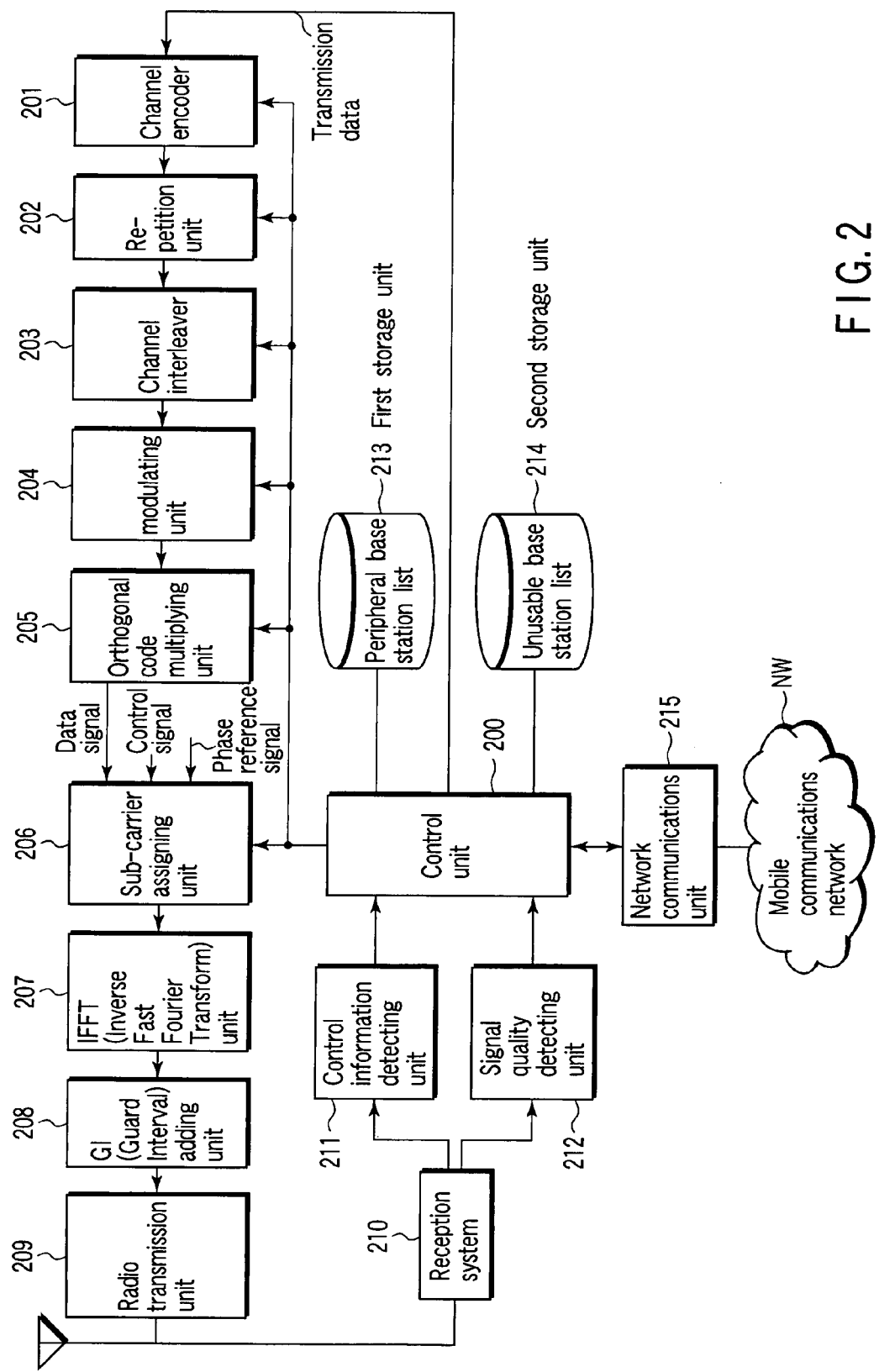
F I G. 2

MOBILE COMMUNICATIONS SYSTEM AND MOBILE RADIO TERMINAL

CROSS-REFERENCE TO RELATED APPLICATIONS

This application is based upon and claims the benefit of priority from prior Japanese Patent Application No. 2007-176569, filed Jul. 4, 2007, the entire contents of which are incorporated herein by reference.

BACKGROUND OF THE INVENTION

1. Field of the Invention

The present invention relates to a mobile communications system such as a cellular telephone system.

2. Description of the Related Art

In a conventional mobile communications system, a number of base stations are provided, and a mobile station executes handover between the base stations in accordance with movement to continue communications. Recently, development of a mobile communications system employing OFDM (Orthogonal Frequency Division Multiplexing) system has proceeded (cf., for example, 3GPP, TR25.814 (V7.1.0), "Physical Layer Aspects for Evolved UTRA").

As restriction of time synchronization is smaller as compared with the CDMA (Code Division Multiple Access) system, in the mobile communications system employing OFDM (Orthogonal Frequency Division Multiplexing) system, searching the base station without using a neighbor base station list which has been transmitted from the base stations to the mobile station, by the mobile station, has been reviewed. This aims to reduce overhead of an informative channel over which neighbor base station information is transmitted.

Even in the mobile communications system employing OFDM, however, reduction of the processing load on searching the base stations and enhancement of the searching efficiency have been highly requested due to limitation of the power consumption.

The development of the mobile communications system employing OFDM has proceeded, but reduction of the processing load on searching the base stations and enhancement of the searching efficiency have been highly requested due to limitation of the power consumption.

BRIEF SUMMARY OF THE INVENTION

The present invention has been accomplished to solve the above-described problems. The object of the present invention is to provide a mobile communications system and a mobile radio terminal, capable of reducing the processing load on searching the base stations and enhancing the searching efficiency.

To achieve this object, an aspect of the present invention is a radio communications system which comprises base stations accommodated in a mobile communications network and a mobile station executing radio communications with the base stations. The mobile station comprises: a searching unit which searches receives radio signals transmitted from the base stations, searches the base stations, and obtains identification information of the base stations capable of communications; and a first transmitting unit which transmits the identification information of the base stations obtained by the searching unit. The base stations each comprises: a storage unit which prestores the identification information of the base station; a first receiving unit which receives the identification information transmitted by the first transmitting unit; and a second transmitting unit which, upon receiving the identification information received by the first receiving unit, transmits the identification information which is not stored in the storage unit, of the received identification information, to the mobile station. The mobile station further comprises: a second receiving unit which receives the identification information transmitted by the second transmitting unit; a second storage unit which stores the identification information received by the second receiving unit; a discriminating unit which discriminates necessity of handover; and a requesting unit which, if the discriminating unit discriminates the necessity of handover, requests the base stations having the identification information other than the identification information stored in the second storage unit, of the identification information of the base stations obtained by the searching unit, to execute handover.

In the present invention, the mobile station searches base stations capable of communications, and transmits identification information of the base stations. The base stations transmit to the mobile station the identification information which is not prestored in the storage unit, of the identification information received from the mobile station. The mobile station requests the base stations other than the base stations having the identification information notified by the base stations, of the searched base stations, to execute handover.

Therefore, according to the present invention, since the base stations which are not prestored in the base stations are not requested to execute handover, for example, the handover to the base stations to which necessity of handover is increased again can be prevented. Consequently, the present invention can provide a mobile communications system and a mobile radio terminal, capable of reducing the process load required for searching of the base stations and enhancing the searching efficiency.

Additional objects and advantages of the invention will be set forth in the description which follows, and in part will be obvious from the description, or may be learned by practice of the invention. The objects and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a configuration of a mobile station in a mobile communications system according to an aspect of the present invention;

FIG. 2 is a block diagram showing a configuration of a base station in the mobile communications system according to the aspect of the present invention.

DETAILED DESCRIPTION OF THE INVENTION

Figure 3:
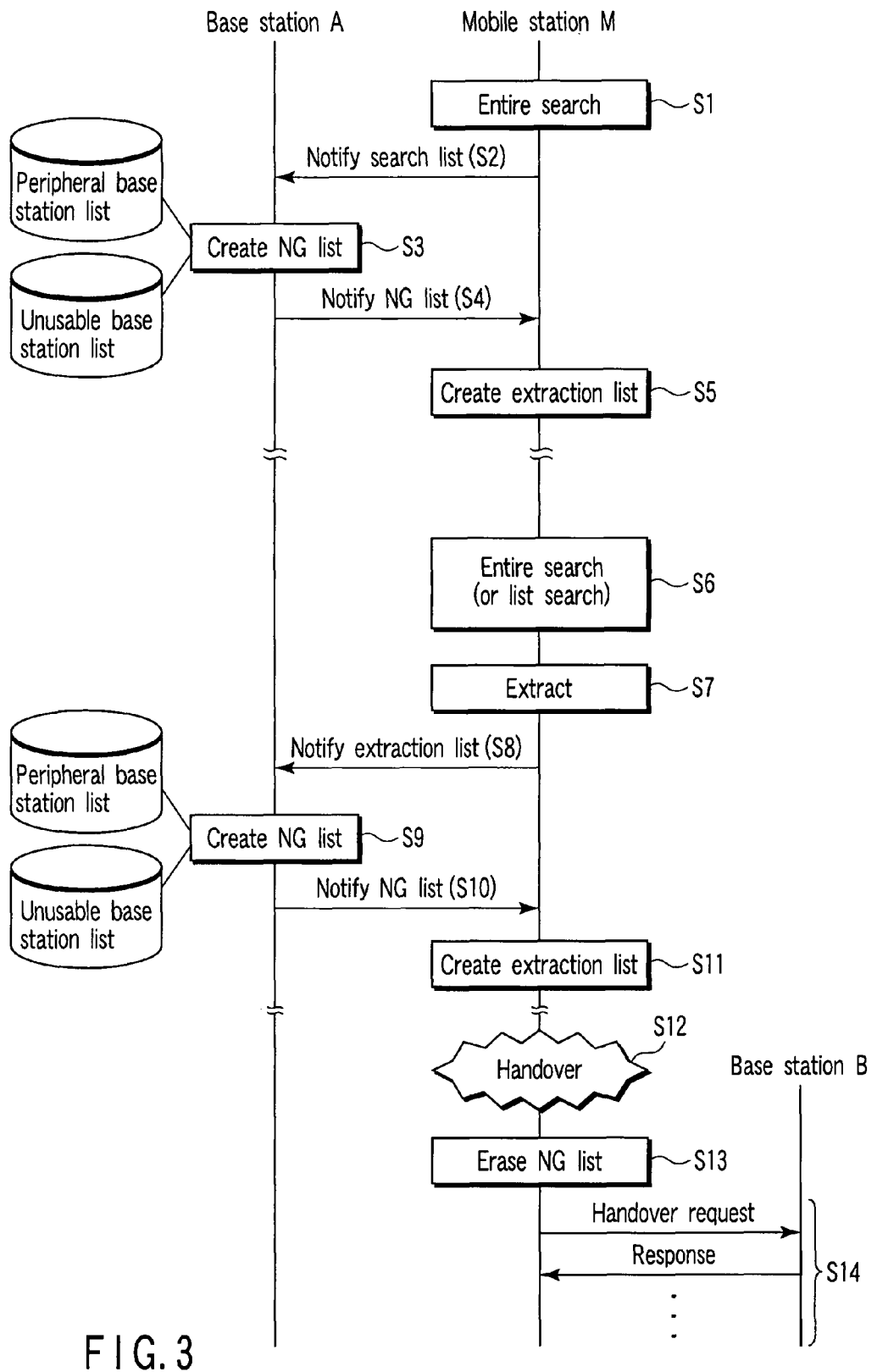
FIG. 3 is a sequence chart describing operations of the mobile communications system according to the aspect of the present invention.

An embodiment of the present invention will be described below with reference to the accompanying drawings. In the following descriptions, OFDM is employed as the modulation scheme for the communications between the base station and the mobile station.

First, a configuration of the mobile station of the radio communication system according to the embodiment of the present invention is described. FIG. 1 mainly shows a configuration of a downlink reception system of the mobile station. As shown in FIG. 1, the mobile station comprises a control unit 100, a radio reception unit 101, a GI (Guard Interval) removing unit 102, an FFT (Fast Fourier Transform) unit 103, a signal separating unit 104, a quality measuring unit 105, a control channel demodulating unit 106, an orthogonal code multiplying unit 107, a demodulating unit 108, a channel de-interleaver 109, a de-repetition unit 110, a channel decoder 111, a transmission system 112 and a storage unit 113.

The radio reception unit 101 comprises a bandpass filter configured to receive a radio signal transmitted from the base station and remove noise outside a desired band from the receive signal, and an AD converter configured to convert the signal passing through the filter into a baseband digital signal.

The GI removing unit 102 removes a guard interval from the baseband digital signal output from the radio reception unit 101.

The FFT unit 103 executes fast Fourier transform for the digital signal from which the guard interval is removed by the GI removing unit 102, converts the signal of the time area into a signal of a frequency area, and splits the signal into signals of respective sub-carriers.

The signal separating unit 104 separates the signals split for the respective sub-carriers into a control signal, a phase reference signal, a data signal and the like, and outputs the separated signals to modules corresponding to the respective signals. In this embodiment, the phase reference signal is output to the quality measuring unit 105 and the demodulating unit 108. The control signal, assigned to the sub-carrier of the control channel, is output to the control channel demodulating unit 106. The data signal, assigned to the sub-carrier of the individual information channel, is output to the orthogonal code multiplying unit 107.

The quality measuring unit 105 measures the power level or power density of the signal received from each of the base stations, by cross-correlation between a scrambling pattern assigned to each of the base stations and the received phase reference signal, and notifies the measured power level or power density to the control unit 100. In addition, the quality measuring unit 105 obtains an interference level from a proportion of the measured power level (or power density) to power levels (or power densities) of the other base stations and notifies the obtained interference level to the control unit 100. Then, the quality measuring unit 105 determines the necessity of handover on the basis of the power level and the interference level.

The control channel demodulating unit 106 demodulates the control signal received from the signal separating unit 104, extracts control information on physical layers, and outputs the control information to the control unit 100. The control information includes MCS information representing a transfer format transmitted from the base station.

The orthogonal code multiplying unit 107 multiplies the data signal by a complex conjugate of an orthogonal code corresponding to parameter N directed by the control unit 100, cancels signal components transmitted from the other base stations, and outputs a result of the multiplication. If the parameter N=1, the orthogonal code multiplying unit 107 outputs the data signal as it is, without multiplying the data signal by the complex conjugate of the orthogonal code.

The demodulating unit 108 obtains channel estimates of the sub-carrier frequency from the phase reference signal, executes channel equalization for the result of multiplication of the orthogonal code multiplying unit 107 by using the channel estimates, demodulates the result of equalization in the demodulation mode directed by the control unit 100, and regenerates bit strings included in the data signal.

The channel de-interleaver 109 executes channel de-interleaving for the bit strings output from the demodulating unit 108, on the basis of the interleaving pattern directed by the control unit 100.

The de-repetition unit 110 accumulates an output of the channel de-interleaver 109, for the parameter N directed by the control unit 100, and outputs the accumulated output as a single data item. If the parameter N=1, the de-repetition unit 110 outputs the output of the channel de-interleaver 109 as it is, without accumulating the result of accumulation.

The channel decoder 111 executes channel decoding for the bit strings output from the channel de-repetition unit 108 at a coding rate R directed by the control unit 100 and regenerates transmission data.

The storage unit 113 stores the control programs and control data of the control unit 100, and comprises a search list storage area 113a where a search list is stored, an NG list storage area 113b where an NG list is stored, and an extraction list storage area 113c where an extraction list is stored.

The control unit 100 generates control information including CQI representing the interference level obtained by the quality measuring unit 105 and transmits the generated control information to the base stations via the transmission system 112. In addition, the control unit 100 preliminarily stores a transmission format table. The transmission format table is made to correspond to the MCS information to identify the transmission format, and information items such as the modulation scheme M, the coding rate R, the parameter N to determine the number of repetition and the orthogonalization, and the like.

The control unit 100 detects the MCS information from the control information extracted by the control channel demodulating unit 106, and recognizes from the MCS information that the transmission formats used to transmit the mobile station by the base stations are the transmission formats represented by the MCS information. Then, the control unit 100 refers to the transmission format table and controls all the units of the mobile station with the parameter corresponding to the MCS information to receive the information transmitted from the base stations. The control unit 100 thereby receives the signals transmitted in the transmission formats from the base stations.

In addition, the control unit 100 executes a cell search process for preparation of handover. In other words, the control unit 100 controls the signal separating unit 104 or the like to receive the control signals (phase reference signals) transmitted from the base stations located in the neighborhood. Then, the control unit 100 detects the base stations which are to serve as candidates of handover, on the basis of a result of measurement of the quality measuring unit 105, forms a list of the identification information of the detected base stations as the search list, and notifies the search list to the base stations employed for the communications or the base stations employed for call wait (for example, base stations having their positions registered).

For example, the control unit 100 specifies base station ID, i.e. identification information of the base station by specifying the orthogonal code or scramble code multiplied by the reference phase signal. In the synchronizing system, the control unit 100 may often specify the initial phase offset value of the orthogonal code or scramble code as the identification information of the base station.

After that, the control unit 100 detects the NG list from the control information transmitted from the base stations, extracts the base station other than the base stations in the NG list on the basis of the search list. After that, the control unit 100 executes handover or informs the base station of the neighbor base stations on the basis of the extraction list.

Next, a configuration of the base station in the radio communication system according to the embodiment of the present invention is described. FIG. 2 mainly shows a configuration of a downlink transmission system of the base station. The base station is accommodated in mobile communications network NW to execute relaying between the above-described mobile station and the mobile communications network.

As shown in FIG. 2, the base station comprises a control unit 200, a channel encoder 201, a re-petition unit 202, a channel interleaver 203, a modulating unit 204, an orthogonal code multiplying unit 205, a sub-carrier assigning unit 206, an IFFT (Inverse Fast Fourier Transform) unit 207, a GI (Guard Interval) adding unit 208, a radio transmission unit 209, a reception system 210, a control information detecting unit 211, a signal quality detecting unit 212, a first storage unit 213, a second storage unit 214, and a network communications unit 215.

The channel encoder 201 executes channel encoding for bit strings included in the transmission data, at a coding rate R directed by the control unit 200.

The re-petition unit 202 executes a repetition process for an output of the channel encoder 201, on the basis of the parameter N directed by the control unit 200, and enlarges each of the bits included in the output of the channel encoder 201 into N bits. If N=1, the re-petition unit 202 does not execute the repetition process.

The channel interleaver 203 executes channel interleaving for an output of the re-petition unit 202, on the basis of an interleaving pattern directed by the control unit 200.

The modulating unit 204 modulates an output of the channel interleaver 203, in modulation scheme M directed by the control unit 200, and generates a data signal represented by a complex number value.

The orthogonal code multiplying unit 205 multiplies the data signal by an orthogonal code having N-bit length, on the basis of the parameter N directed by the control unit 200. If N=1 is directed, the orthogonal code multiplying unit 205 does not execute the multiplication of the orthogonal code.

The sub-carrier assigning unit 206 generates signals by assigning the data signal, control signal and phase reference signal output from the orthogonal code multiplying unit 205 to the respective sub-carriers corresponding thereto, in accordance with the directions from the control unit 200.

The IFFT unit 207 executes OFDM modulation for the signals output from the sub-carrier assigning unit 206 to generate an OFDM signal as a sequence of a plurality of OFDM symbols. In other words, the IFFT unit 207 generates an OFDM signal by converting signals of the frequency area into signals of the time area.

The GI adding unit 208 adds guard interval to the OFDM signal output from the IFFT unit 207 and outputs the OFDM signal.

The radio transmission unit 209 comprises a digital-analog converter configured to execute digital-analog conversion for the output of the GI adding unit 208, an up-converter configured to up-convert an output of the digital-analog converter, and a power amplifier configured to amplify power for an output of the up-converter. A radio (RF) signal is generated by these modules and transmitted from the antenna.

The reception system 210 receives a radio signal transmitted from the mobile station.

The control information detecting unit 211 detects control information transmitted to the own base station, in the signal which the reception system 210 receives from the mobile station.

The signal quality detecting unit 212 detects the quality of the signal which the reception system 210 receives from the mobile station.

The first storage unit 213 stores a list of identification information of the neighbor base stations located in the vicinity of the base station.

The second storage unit 214 stores identification information of base stations which cannot be operated or are not to be operated due to troubles or heavy traffic as received from a center apparatus (not shown) or the other base stations in the mobile communications network NW via the network communications unit 215, as an unusable base station list.

The network communications unit 215 is controlled by the control unit 200 to execute relay communications to the mobile station M via the mobile communications network NW and the communications with the center apparatus and the other base stations.

The control unit 200 stores the transmission format table. Then, the control unit 200 selects a transmission format which should be used for the transmission to the mobile station, on the basis of the control information (CQI) detected by the control information detecting unit 211 and the signal quality detected by the signal quality detecting unit 212, includes the MCS information indicating the selected transmission format in the control information, and transmits the control information to the mobile station.

The transmission format prestored in the control unit 200 is composed of a combination of the modulation scheme M, the coding rate R, and the parameter N to determine the number of repetition and the orthogonalization, and distribution to the coding rate R and the number of repetition N is varied. As for a criterion to selection of the transmission format, it is discriminated whether or not the position where the mobile station is located is an area subject to interference, such as an area between the sectors formed by the base stations, on the basis of the previously selected transmission format, the control information (CQI) and the signal quality, and the transmission format is determined on the basis of the result of discrimination.

When the control unit 200 thus determines the transmission format, the control unit 200 transmits the MCS information indicating the determined transmission format to the mobile station. After that, the control unit 200 controls all the units of the mobile station to transmit the data signal in the transmission format to the mobile station.

In addition, the control unit 200 has a function of detecting a base station which is unsuitable as a handover partner from the search list notified from the mobile station and notifying the unsuitable base station to the mobile station. In other words, the control unit 200 obtains the search list notified from the mobile station together with the identification information, from the control information detected by the control information detecting unit 211, extracts base stations which are not stored in the first storage unit 213 as the neighbor base station list, from the search list, and handles a list of the base stations as an NG list. Then, the control unit 200 controls the sub-carrier assigning unit 206, assigns the NG list to the sub-carriers as the control signal, and sends back the NG list to the mobile station which has transmitted the search list.

Next, operations of the mobile communications system having the above-explained configuration are described. FIG. 3 shows a sequence in which the base station notifies the mobile station of a base station which is unsuitable as a handover partner. The operations are described below with reference to the drawing. The sequence is repeated between mobile station M and base station A that the mobile station M employs for wait of an incoming signal or for communications, and is executed until the handover to base station B.

First, in sequence S1, the control unit 100 of the mobile station M controls the signal separating unit 104, the quality measuring unit 105 and the control channel demodulating unit 106 to attempt receipt of the control signals for all the base stations and measure the power level of each of the control signals, as a first base station search. The control unit 100 detects the base stations (including the base station B) which are suitable as handover partners and which can obtain the power levels higher than a preset threshold value, of the measured power levels. The control unit 100 generates a search list of identification information of the detected base stations and stores the search list in the search list storage area 113a. In the search list, an index number is assigned to each of the base stations in the list, by the control unit 100.

In sequence S2, the control unit 100 of the mobile station M transmits the search list stored in the search list storage area 113a as the control information, to the base station A via the transmission system 112. The control unit 200 of the base station A controls the reception system 210 and the control information detecting unit 211 to receive the control information including the search list.

In sequence S3, the control unit 200 of the base station A compares the received search list, the neighbor base station list prestored in the first storage unit 213, and the unusable base station list stored in the second storage unit 214, extracts the index numbers of the base stations of the search list not stored as the neighbor base station list and the base stations of the search list stored as the unusable base station list, and creates a list of the extracted index numbers as the NG list.

In sequence S4, the control unit 200 of the base station A generates the control signal including the NG list and transfers the control signal to the sub-carrier assigning unit 206. The control unit 200 controls the sub-carrier assigning unit 206 to assign the control signal to the sub-carrier for the mobile station M and transmit the NG list to the mobile station M.

The control unit 100 of the mobile station M controls the signal separating unit 104 and the control channel demodulating unit 106 to receive the control signal transmitted from the base station A and obtain the NG list from the control signal. Then, the control unit 100 stores the NG list in the NG list storage list 113b.

In sequence S5, the control unit 100 of the mobile station M compares the index numbers in the search list stored in the search list storage area 113a and the index numbers in the NG list stored in the NG list storage list 113b, extracts the base stations in the search list, which are not included in the NG list, and stores a list of the identification information of the extracted base stations as the extraction list, in the extraction list storage area 113c. After that, if necessity of the handover is increased, the base station serving as the handover partner is selected in the extraction list stored in the extraction list storage area 113c.

After that, when a preset time has lapsed and a timing of base station search has come again, the control unit 100 of the mobile station M controls the signal separating unit 104, the quality measuring unit 105 and the control channel demodulating unit 106 to attempt receipt of the controls signals for all the base stations and measure the power level of each of the control signals, in sequence S6. Then, the control unit 100 detects the base stations (including the base station B) which are suitable as the handover partners and which can obtain the power levels higher than a preset threshold value, of the measured power levels. The control unit 100 creates a search list of the identification information of the detected base stations and stores the search list in the search list storage area 113a. Similarly to the sequence S1, the index number is assigned to each of the base stations included in the search list by the control unit 100.

In the sequence S6, all the base stations do not need to be searched, but the only base stations that are included in the extraction list created in the sequence S5 and stored in the extraction list storage area 113c may be searched or all the base stations other than the base stations in the NG list may be searched. In this case, sequence S7 is omitted.

In sequence S7, the control unit 100 of the mobile station M compares the index numbers in the search list stored in the search list storage area 113a and the index numbers in the NG list stored in the NG list storage list 113b, extracts the base stations in the search list, which are not included in the NG list, and stores a list of the identification information of the extracted base stations as an extraction list, in the extraction list storage area 113c. If necessity of the handover is increased, the base station serving as the handover partner is selected in the extraction list stored in the extraction list storage area 113c.

In sequence S8, the control unit 100 of the mobile station M transmits the extraction list stored in the extraction list storage area 113c, as the control information, to the base station A via the transmission system 112. The control unit 200 of the base station A controls the reception system 210 and the control information detecting unit 211 to receive the control information including the search list.

In sequence S9, the control unit 200 of the base station A compares the received search list, the neighbor base station list prestored in the first storage unit 213, and the unusable base station list stored in the second storage unit 214, extracts the index numbers of the base stations of the search list, which are not stored as the neighbor base station list and the base stations of the search list stored as the unusable base station list, and creates a list of the extracted index numbers as the NG list. Since the NG list has been transmitted to the mobile station M in the sequences S3 and S4, the NG list is created only when the base station corresponding to the NG list is newly extracted in the sequence S7.

In sequence S10, the control unit 200 of the base station A generates the control signal including the NG list and transfers the control signal to the sub-carrier assigning unit 206. The control unit 200 controls the sub-carrier assigning unit 206 to assign the control signal to the sub-carrier for the mobile station M and transmit the NG list to the mobile station M.

The control unit 100 of the mobile station M controls the signal separating unit 104 and the control channel demodulating unit 106 to receive the control signal transmitted from the base station A and obtain the NG list from the control signal. Then, the control unit 100 additionally stores the NG list, besides the NG list which has been stored in the NG list storage list 113b.

In sequence S11, the control unit 100 of the mobile station M compares the index numbers in the search list stored in the search list storage area 113a and the index numbers in the NG list stored in the NG list storage list 113b, extracts the base stations in the search list, which are not included in the NG list, and overwrites a list of the identification information of the extracted base stations as the extraction list, in the extraction list storage area 113c. After that, if necessity of the handover is increased, the base station serving as the handover partner is selected in the extraction list stored in the extraction list storage area 113c.

After that, when the receiving quality from the base station A is deteriorated and lowered to the level at which the handover is required, the quality measuring unit 105 detecting the deterioration of the receiving quality discriminates that the necessity of handover has been increased and notifies the increased necessity of handover to the control unit (sequence S12). In sequence S13, as soon as the control unit 100 of the mobile station M receives the notification from the quality measuring unit 105, the control unit 100 erases the NG list stored in the NG list storage list 113b. The control unit 100 may execute the erasure of the NG list after the handover has been completed or when the control unit 100 obtains the NG list from the base station B serving as the handover partner. In addition, the NG list may be stored for each base station until the handoff is executed at a plurality of times or the handoff is executed between the base stations other than the specific base stations, considering an environment in which the handoff is repeated between specific base stations.

Subsequently, in sequence S14, the control unit 100 of the mobile station M controls the transmission system 112 to transmit a handover request to the base station B that is most promising as the handover partner, of the base stations indicated by the extraction list stored in the extraction list storage area 113c. After that, the handover to the base station B is completed in predetermined steps.

In the mobile communications system having the above-explained configuration, the mobile station M notifies the base station A of the identification information of the base stations detected by the search, as the search list, and the base station A notifies the mobile station M of the base stations which are not identical with the prestored neighbor base stations and the base stations which are in the unusable base station list, of the base stations of the notified search list, as the NG list. When the necessity of handover is increased, the mobile station M receiving the notification executes the handover to the base stations (for example, base station B) in the search list, except the base stations included in the NG list.

Therefore, according to the mobile communications system having the above-explained configuration, if a remote base station is accidentally detected by the search in an environment in which the mobile station M is blocked by a building, a direction (NG list) excluding the remote base station is obtained from the base station which is waiting (or in the communications) and the handover can be executed while excluding such base stations. Similarly, the base stations which cannot be operated or are not to be operated due to troubles or heavy traffic can be excluded. For this reason, since the handover to the base station in which the necessity of handover is increased soon or which is not to be operated in system can be prevented, frequent handover can be prevented. Consequently, the process load on the base station search can be reduced and the searching efficiency can be enhanced.

In addition, the identification information and the index numbers of the base stations as associated with each other are notified to the base station A as the search list, and the base station A notifies the mobile station M of the index numbers of the corresponding base stations as the NG list. For this reason, the NG list can be notified to the mobile station M at a few bits.

Moreover, even when the mobile station M executes the base station search after receiving the NG list from the base station A, the mobile station M does not notify the base station A of the base stations included in the NG list. For this reason, the information notified to the base station A can be reduced.

As a modified example of the sequence S6, even when the mobile station M executes the base station search after receiving the NG list from the base station A, the mobile station M does not search the base stations included in the NG list. For this reason, since the base stations having the necessity of handover lowered are not searched, the power consumption can be reduced.

Furthermore, more power consumption can be reduced by searching the only base stations in the extraction list other than the NG list.

In addition, when the handover occurs, the NG list obtained from the base station A is erased. For this reason, it is possible to prevent the base stations from being inaccurately searched in an inappropriate NG list due to occurrence of the handover.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

For example, when the handover occurs, the old NG list is erased in the above-described embodiment. Instead of this, however, when the control unit 100 manages a time to obtain the NG list and more than a preset time has elapsed, the NG list may be erased or updated. The same advantages can also be thereby obtained.

Otherwise, the present invention can be variously modified within a scope which does not depart from the gist of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communications system, comprising base stations accommodated in a mobile communications network and a mobile station executing radio communications with the base stations, the mobile station comprising:
 a searching unit which searches radio signals transmitted from the base stations, searches the base stations, and obtains identification information of one or more target base stations capable of communications; and
 a first transmitting unit which transmits the identification information of the target base stations obtained by the searching unit, the target base stations each comprising:
 a first storage unit which pre-stores the identification information of the target base station;
 a first receiving unit which receives the identification information transmitted by the first transmitting unit; and
 a second transmitting unit which, upon receiving the identification information received by the first receiving unit, transmits the identification information which is not stored in the first storage unit, of the received identification information, to the mobile station, the mobile station further comprising:

a second receiving unit which receives a No Good (NG) list indicating identification information not stored in the target base stations and identification information of unusable base stations from the second transmitting unit;

a second storage unit which stores the No Good (NG) list received by the second receiving unit;

a discriminating unit which discriminates necessity of handover; and a requesting unit which, if the discriminating unit discriminates the necessity of handover, requests the target base stations having identification information other than the identification information indicated in the No Good (NG) list to perform the handover.

2. The system according to claim 1, wherein if the second receiving unit receives the identification information, the first transmitting unit transmits the identification information other than the identification information stored in the second storage unit, of the identification information of the target base stations obtained by the searching unit.

3. The system according to claim 1, wherein if the second receiving unit receives the identification information, the requesting unit requests the target base stations having the identification information other than the identification information stored in the second storage unit, of the identification information of the target base stations obtained by the searching unit, to execute handover.

4. The system according to claim 1, wherein the mobile station further comprises an erasing unit which erases the identification information stored in the second storage unit if the requesting unit makes the request.

5. The system according to claim 1, wherein the mobile station further comprises an erasing unit which erases the identification information stored in the second storage unit if a preset time has elapsed after the second storage unit stores the identification information.

6. A mobile radio terminal establishing radio communications with base stations accommodated in a mobile communications network, comprising:

a searching unit which searches radio signals transmitted from the base stations, searches the base stations, and obtains identification information of one or more target base stations capable of communications;

a first transmitting unit which transmits the identification information of the target base stations obtained by the searching unit, each of the target base stations including a first storage unit which pre-stores the identification information of the target base station, a first receiving unit which receives the identification information transmitted by the first transmitting unit, and a second transmitting unit which, upon receiving the identification information received by the first receiving unit, transmits the identification information which is not stored in the first storage unit, of the received identification information, to the mobile station;

a second receiving unit which receives a No Good (NG) list indicating identification information not stored in the target base stations and identification information of unusable base stations from the target base stations;

a second storage unit which stores the No Good (NG) list received by the second receiving unit;

a discriminating unit which discriminates necessity of handover; and a requesting unit which, if the discriminating unit discriminates the necessity of handover, requests the target base stations having identification information other than the identification information indicated in the No Good (NG) list to perform the handover.

7. The apparatus according to claim 6, wherein if the second receiving unit receives the identification information, the first transmitting unit transmits the identification information other than the identification information stored in the second storage unit, of the identification information of the target base stations obtained by the searching unit.

8. The apparatus according to claim 6, wherein if the second receiving unit receives the identification information, the requesting unit requests the target base stations having the identification information other than the identification information stored in the second storage unit, of the identification information of the target base stations obtained by the searching unit, to execute handover.

9. The apparatus according to claim 6, wherein the mobile station further comprises an erasing unit which erases the identification information stored in the second storage unit if the requesting unit makes the request.

10. The apparatus according to claim 6, wherein the mobile station further comprises an erasing unit which erases the identification information stored in the second storage unit if a preset time has elapsed after the second storage unit stores the identification information.

* * * * *